(12) United States Patent
Oami et al.

(10) Patent No.: US 6,474,976 B1
(45) Date of Patent: Nov. 5, 2002

(54) FILM OR SHEET HOLDING APPARATUS FOR AN INJECTION MOLD

(75) Inventors: Kotaro Oami; Masaaki Suzumura, both of Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 46 days.

(21) Appl. No.: 09/616,511

(22) Filed: Jul. 14, 2000

(30) Foreign Application Priority Data

Jul. 29, 1999 (JP) .......................................... 11-215578

(51) Int. Cl.[7] .............................................. B29C 45/16
(52) U.S. Cl. ........................ 425/503; 425/542; 425/504
(58) Field of Search ........................ 425/DIG. 60, 542, 425/503, 504; 264/277

(56) References Cited

U.S. PATENT DOCUMENTS 5,776,509 A * 7/1998 Ota et al. ............ 425/DIG. 60

FOREIGN PATENT DOCUMENTS

| JP | 10-24443 | 1/1998 |
| JP | 10-113933 | 5/1998 |

* cited by examiner

*Primary Examiner*—Tim Heitbrink
(74) *Attorney, Agent, or Firm*—Morgan & Finnegan, LLP

(57) ABSTRACT

To provide a film holding apparatus for an injection mold which is capable of surely holding a protective film on a specific position of a mold surface of the injection mold. The film holding apparatus for holding an inner film on the mold surface of the injection molds consisting of two coupled molds having substantially-vertical coupled surfaces thereof includes two positioning pins that can hang an upper edge side of the inner film on an upper edge portion of the mold surface of the mold, and upper and lower vacuum opening portions for film adsorption disposed so as to interpose the positioning pins therebetween from the upper and lower sides. The upper vacuum opening portion is formed in a line, which extends along an upper edge of the mold surface.

5 Claims, 6 Drawing Sheets

FIG. 2
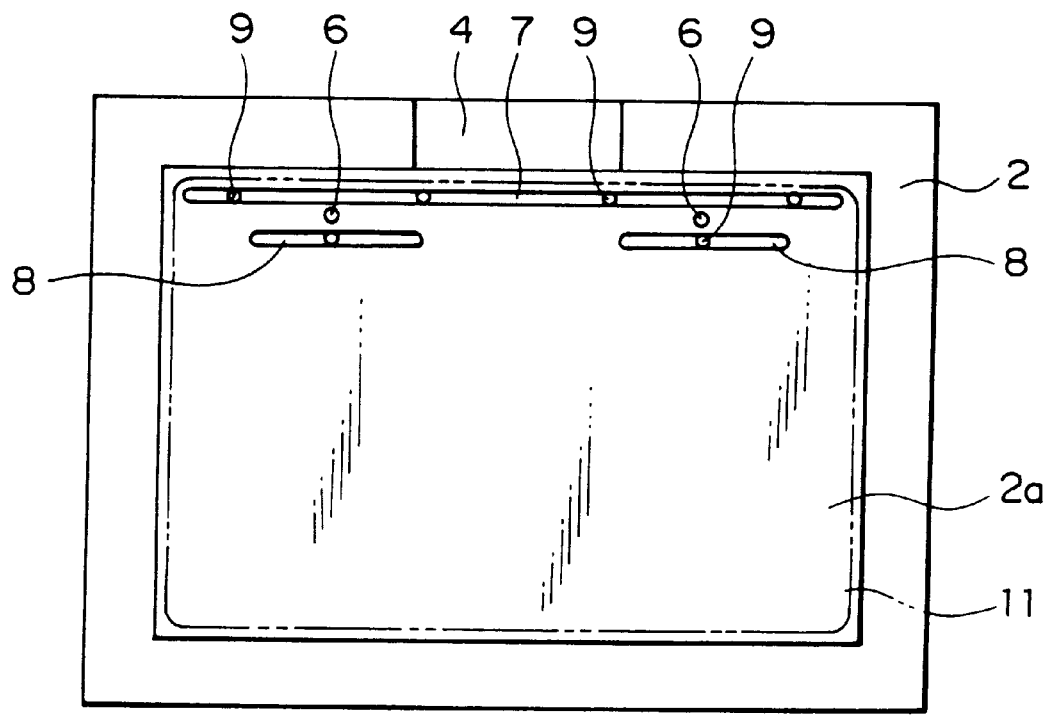
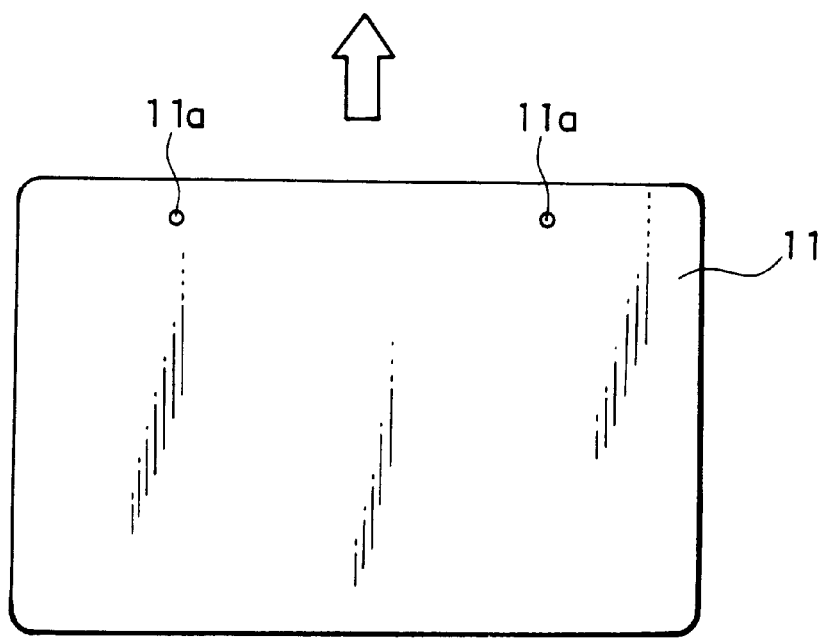

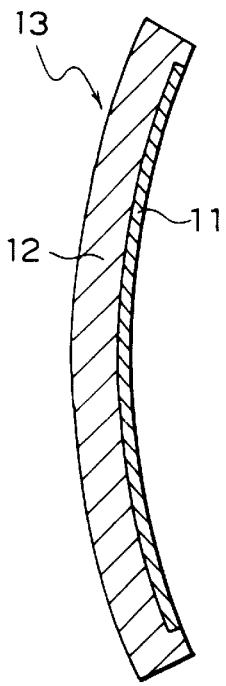
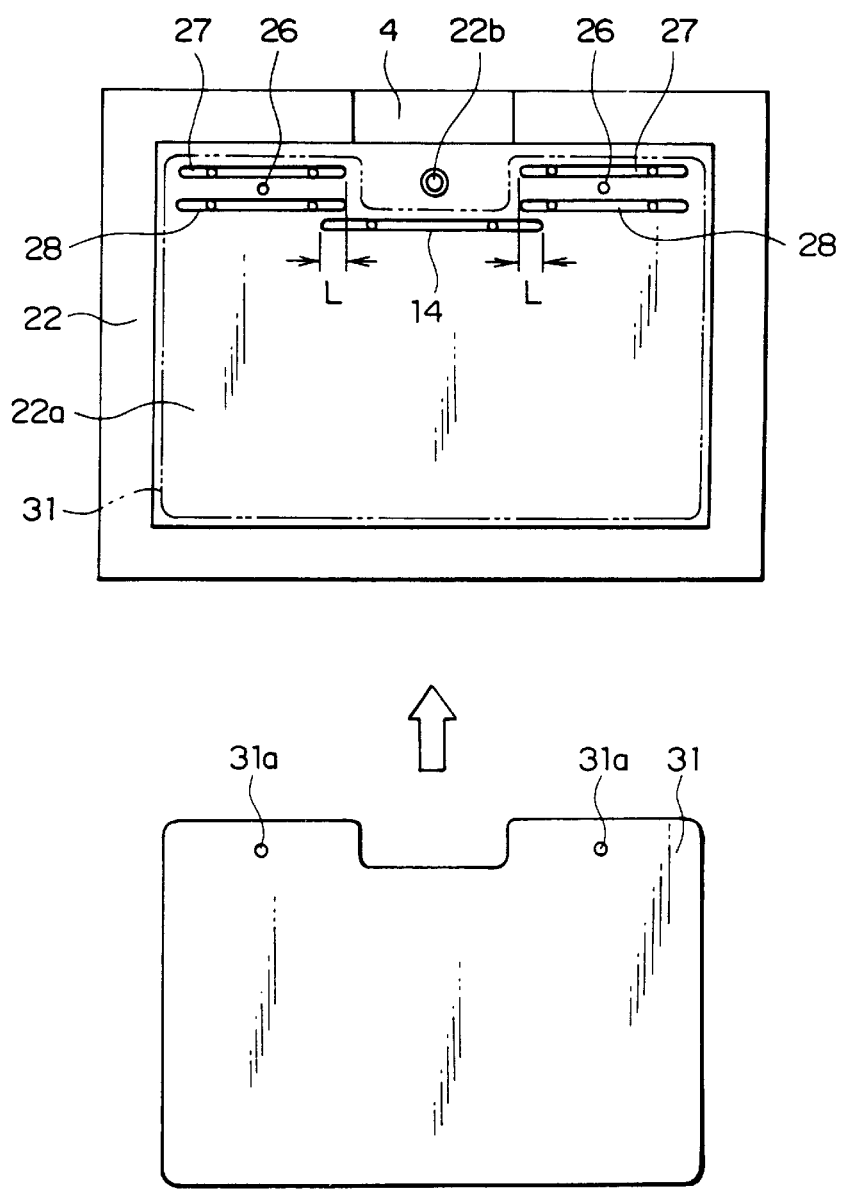

FILM OR SHEET HOLDING APPARATUS FOR AN INJECTION MOLD

BACKGROUND OF THE INVENTION

1. Field of the Invention

The present invention relates to a film or sheet holding apparatus for setting a film or sheet disposed on a panel-shaped resin injection molded product within an injection mold for the purpose of protecting or decorating the surface of the resin molded product, or other purposes in the case where, for example, the panel-shaped resin molded product is injection-molded.

2. Description of the Related Art

Up to now, for example, in a vehicle window for an automobile, in order to make the vehicle light in weight, there has been known a lighting member made of a resin that is smaller in specific gravity than glass. However, there arises such a problem that the surface of the resin window is liable to be damaged when it is brought into physical contact with another substance. To prevent the above problem, the surface of the resin window is protected by coating a hard coat layer thereon, for example, by coating a protective film with a hard coat that is high in abrasion resistance from the viewpoint of protecting the quality of the resin window.

The above resin window is molded by insert molding. That is, as shown in FIG. 7, a molten resin is injected into a cavity 102 in a state where a protective film 103, which has been cut in a size corresponding to the shape of the resin window to be molded in advance, is set on one inner mold surface (or both of inner mold surfaces) of two coupled-type injection molds 101 having vertical coupled surfaces thereof, whereby the surface of the resin window is coated with the protective film 103 simultaneously upon being molded. In this situation, in the event that the surface of the resin window is coated with the protective film 103 identical shape with or smaller in shape than the surface of the resin window as shown in the figure, the protective film 103 is held within the cavity 102.

Under the above circumstance, up to now, as means for holding the protective film 103 on the mold surface of the injection mold 101, as shown in FIG. 8, the protective film 103 is adsorbed and held by a plurality of vacuum holes 105 disposed laterally with respect to two positioning pins 104 that are located on an upper edge side of the mold surface (a resin filling inlet side) in a state that an upper edge portion of the protective film 103 is hung on those positioning pins 104.

Note that the small holes of the protective film 103, which correspond to the positioning pins 104, are so formed as to be larger in diameter than the positioning pins 104 with a margin, taking into consideration the expansion of the protective film 103 due to temperature, a manufacturing variation and the efficiency of working. For that reason, there is a case in which a floating 103a may be produced on the molded surface of the protective film 103, as shown in FIG. 9A, when the protective film 103 is adsorbed by the vacuum holes 105 after the upper end portion of the protective film 103 is hung on the positioning pins 104. Also, as shown in FIG. 9B, there is a possibility that a peeling 103b from the positioning pins 104 is produced on a portion apart from the vacuum holes 105 after the protective film 103 is adsorbed and before closing mold, or before the molten resin is injected.

When the floating 103a or the peeling 103b occurs, there arises such a problem that the molten resin goes to a front surface side of the protective film 103 beyond the portions of the floating 103a or the peeling 103b during an injection molding process, resulting in a defective.

SUMMARY OF THE INVENTION

The present invention has been made in view of the above problems inherent in the conventional apparatus, and therefore has an object to provide a film or sheet holding apparatus for an injection mold which is capable of surely holding a film or sheet at a specific position of a mold surface of the injection mold.

In order to achieve the above object, according to the present invention, there is provided a film or sheet holding apparatus for an injection mold for holding a film or sheet on a mold surface of the injection mold consisting of two coupled molds having substantially-vertical coupled surfaces thereof, said apparatus comprising: hanging means for hanging an upper edge side of a film or sheet on an upper edge portion of the mold surface of the injection mold; and an adsorbing device that adsorbs the film or sheet onto the mold surface of the injection mold through said upper and lower vacuum opening means disposed on the mold surface of the injection mold so as to interpose said hanging means therebetween from the upper and lower sides; wherein said respective upper and lower vacuum opening means extend along an upper edge of the mold surface of the injection mold.

BRIEF DESCRIPTION OF THE DRAWINGS

FIG. 2 is a front view showing the film holding apparatus according to the first embodiment of the present invention and an inner film supported by the film holding apparatus;

FIG. 3 is a cross-sectional view showing a resin window as a molded product;

FIG. 4 is a front view showing the film holding apparatus according to a second embodiment of the present invention and an inner film supported by the film holding apparatus;

DETAILED DESCRIPTION OF THE PREFERRED EMBODIMENTS

Now, a description will be given in more detail of preferred embodiments of the present invention with reference to the accompanying drawings.

A first embodiment will be described with reference to FIGS. 1 to 3. This embodiment is concerned with a protective film for protecting surfaces of a resin window used for a rear window or a sun roof in an automobile, more particularly, an inner film provided for protecting an inner surface of the resin window.

Figure 1:
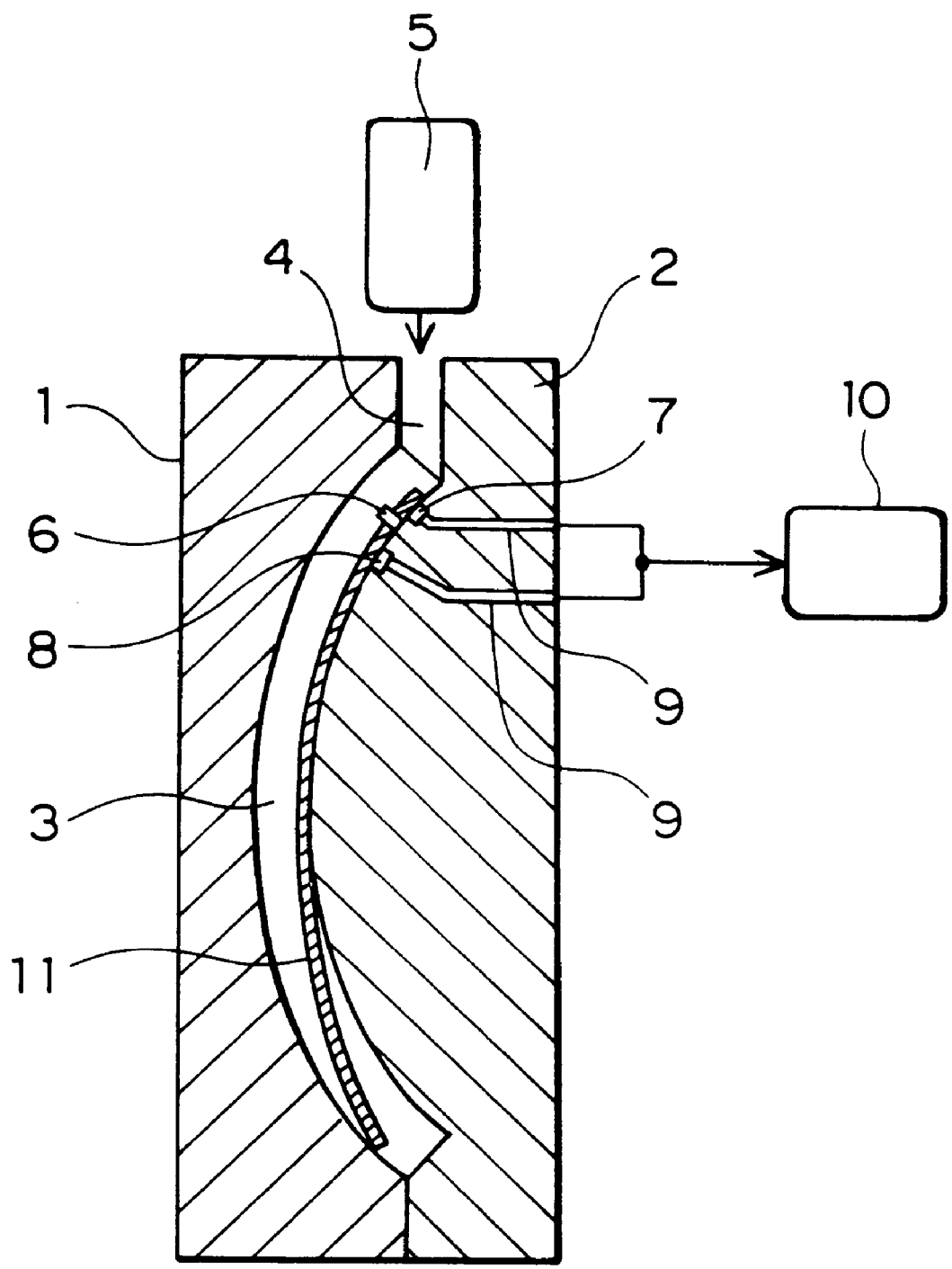
FIG. 1 is a cross-sectional view showing a film holding apparatus for an injection mold in accordance with a first embodiment of the present invention.

As shown in FIG. 1, insert molds 1 and 2 used for insert molding are made up of coupled molds having substantially-vertical coupled surfaces thereof, and includes a resin filling inlet 4 for filling a cavity 3 with a molten resin injected from an injection molding machine 5, on their upper side in a state where those injection molds 1 and 2 are coupled to each other. The cavity 3 formed by both the molds 1 and 2 is rectangular when being viewed from the front and shaped in a curved panel when being viewed from the side thereof. Also, a film holding device for setting and holding an inner film 11 to be insert-molded is disposed on an upper side of the mold 2 having a mold surface on a convex side of the cavity 3 (a concave surface side in a molded product), that is, on a resin filling inlet 4 side.

The film holding device is made up of two right and left positioning pins 6 disposed laterally on the upper edge portion of an inner mold surface 2a of the mold 2, a first vacuum opening portion 7 and second vacuum opening portions 8. The number of the positioning pins 6 may be more than two.

As shown in FIG. 2, those two positioning pins 6 are provided upright at a given interval on the upper edge side of the mold surface 2a along the upper edge. It is desirable that the projected height of the positioning pins 6 is configured to be as small as possible because the pins generate pin holes in the resin window that is a molded product.

The first and second vacuum opening portions 7 and 8 are so disposed as to interpose the positioning pins 6 therebetween from the upper and lower sides thereof. That is, the first vacuum opening portion 7 is formed in a straight groove that is continuous substantially over the overall length of the upper edge of the mold surface 2a along the vicinity of the upper edge thereof. On the other hand, the second vacuum opening portions 8 are formed in a line within a minimum region below the respective positioning pins 6.

The first and second vacuum opening portions 7 and 8 arranged as described above are connected to a vacuum creating device 10 through communicating holes 9 that penetrate the mold 2.

The film setting device for an injection mold according this embodiment is structured as described above. The inner film 11 used in the insert molding for the resin window is made of a transparent resin such as a polycarbonate resin or acrylic resin. In a pre-stage of an injection molding process, the inner film 11 formed with a hardened layer (hard coat layer) through a known hard coating process is cut in a given shape slightly smaller than the outer shape of the resin window to be molded, and in an inner-film cutting process, two small holes 11a which can be hung on the positioning pins 6 are formed at the same time. If three or more positioning pins 6 are provided, the small holes 11a of the same number should be formed.

The inner film 11 thus prepared is hung on the positioning pins 6 of the mold 2 through the small holes 11a and positioned at a specific position of the mold surface 2a in a state that the molds 1 and 2 are decoupled from each other. Thereafter, the adsorbing force of the vacuum creating device 10 is exerted on the inner film 11 through the vacuum opening portions 7 and 8 by the opening operation of a valve not shown so that the upper edge side of the inner film 11 is adsorbed on the mold surface 2a. Thus, the inner film 11 is held and set by the inner mold surface 2a of the mold 2.

Thereafter, the molten resin which is a base material of a resin panel to be molded is injected and filled into the cavity 3 defined by the molds 1 and 2 by the injection molding machine 5 through the resin filling inlet 4 in a state that those molds 1 and 2 are coupled with each other, and the inner film 11 is fused by heat of the molten resin in this situation.

With the above process, as shown in FIG. 3, a resin window 13 having a resin panel 12 the surface of which is coated with the inner film 11 is molded. In this case, in this embodiment, because the inner film 11 is set to be slightly smaller than the outer shape of the resin panel 12, the molten resin goes up to the end surface of the inner film 11 in an injection molding process. For that reason, the outer peripheral edge of the inner film 11 as molded is surrounded by the resin panel 12 with the result that peeling is effectively prevented.

According to this embodiment, since the upper edge portion of the inner film 11 is adsorbed on the inner mold surface 2a by the first vacuum opening portion 7 formed in a straight groove as means for holding the inner film 11 on the inner mold surface 2a of the mold 2, no floating of the inner film 11 occurs over the overall width of the upper edge portion thereof. Also, since the inner film 11 is adsorbed at areas above and below the positioning pins 6 by the first and second vacuum opening portions 7 and 8 between which the pins 6 is sandwiched, there is no case in which the inner film 11 is separated from the positioning pins 6. Accordingly, since the positioning pins 6 continue to exhibit the displacement preventing function of the inner film 11 during the injection, the displacement of the film 11 due the filling pressure of the molten resin is surely prevented.

For the above reason, since the inner film 11 is always held at the specific position of the mold surface 2a in the injection molding process of the resin panel 12, the resin window 13 with a high quality can be obtained.

Also, since the inner film 11 is held by only the resin filling inlet 4 side of the molds 1 and 2, the inner film 11 is stretched by a flow of the molten resin filled in the cavity 3 while the inner film 11 is pushed against the mold surface 2a. For that reason, the inner film 11 comes to an excellent state where the inner film 11 has no crinkling over the overall area.

Subsequently, a second embodiment of the present invention will be described with reference to FIGS. 4 and 5. In the case of molding a resin window having a projection at a specific portion of the peripheral edge of a resin panel, an inner film is formed into a shape so as not to cover the projection.

Figure 5:
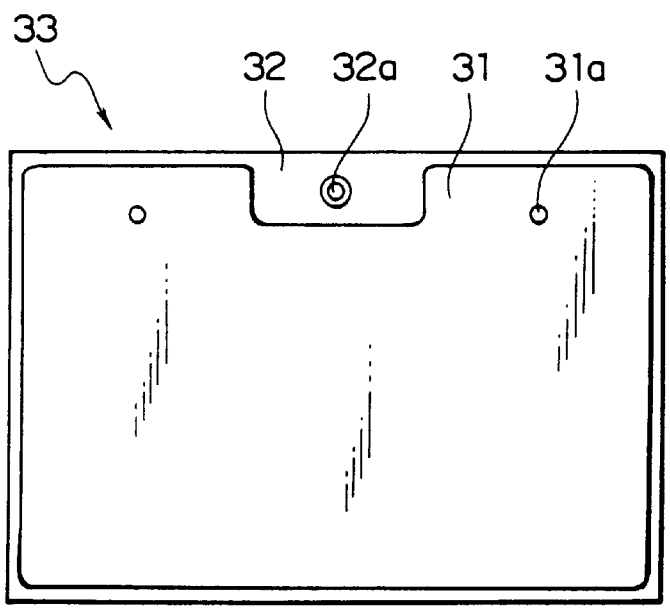
FIG. 5 is a front view showing a resin window as a molded product.

FIG. 5 shows a case in which, for example, a boss 32a for mounting a fitting is disposed substantially in the center of the upper edge portion of a resin panel 32 as a projection. The upper edge portion of an inner film 31 has such a notch that the center portion thereof is recessed inwardly so as not to cover the boss 32a.

Therefore, in this example, the vacuum opening portion cannot be arranged in a continuous straight line by the limit of the shape. The second embodiment is made to provide a film holding apparatus effective in this case.

In the second embodiment, as shown in FIG. 4, two right and left positioning pins 26 to be engaged with two small holes 31a of an inner film 31 are arranged laterally on the upper edge portion of a mold surface 22a of a mold 22, and first and second vacuum positioning portions 27 and 28 are disposed on the right and left of the upper edge so as to interpose the respective positioning pins 26 therebetween from the upper and lower sides. Also, a third vacuum opening portion 14 is disposed at a center portion and displaced downwardly as an auxiliary vacuum opening portion. In this manner, a film holding apparatus is constructed. In FIG. 4, a boss molding portion 22b for molding the boss 32a is disposed substantially at the center of the upper edge portion of the mold surface 22a.

The respective vacuum opening portions 27, 28 and 14 are formed into a line along the upper edge, respectively, and both end portions of the third vacuum opening portion 14 are arranged so as to be overlapped with the end portions of the first and second vacuum opening portions 27 and 28 vertically in the widthwise direction. Even if the notch is formed on the upper edge portion of the inner film 31 as shown in the figure, the upper edge portion of the inner film 31 can be adsorbed on the mold surface 22a substantially in a continuous manner by providing the overlapped portion L.

Therefore, according to the second embodiment, even with the inner film 31 having a notch on the upper edge portion, a floating of the inner film 31 can be prevented over the overall width of the upper edge portion, and the inner film 31 can be surely hung on the positioning pins 26 so that the inner film 31 is not displaced, as in the above-described first embodiment, with the result that a resin window 33 high in quality can be obtained.

Figure 6:
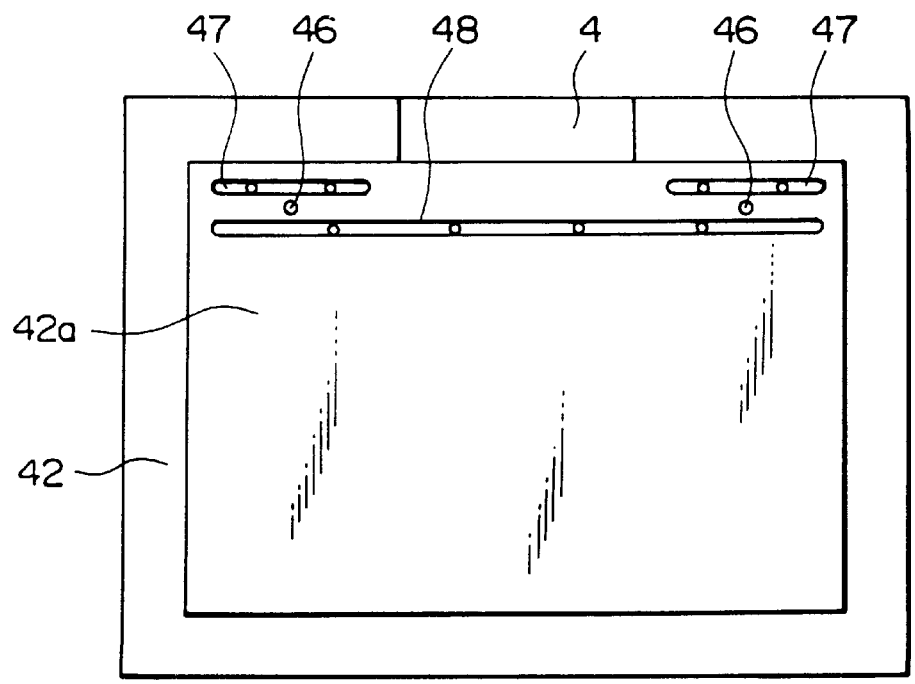
FIG. 6 is a front view showing a film holding apparatus according to another embodiment of the present invention.
Figure 7:
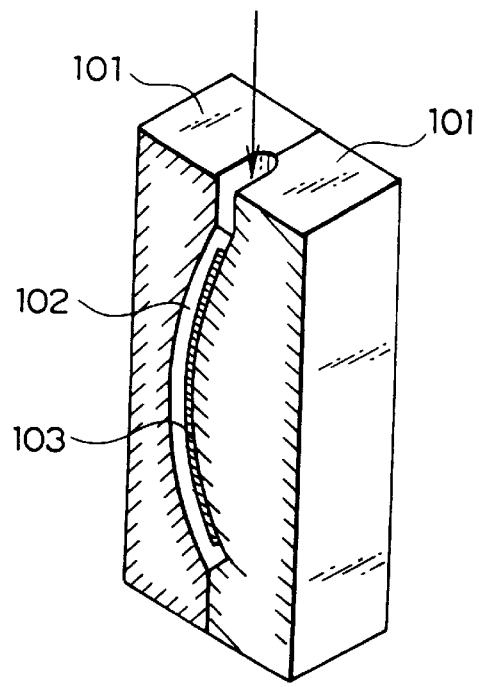
FIG. 7 is a cross-sectional view showing an injection mold for insert molding.
Figure 8:
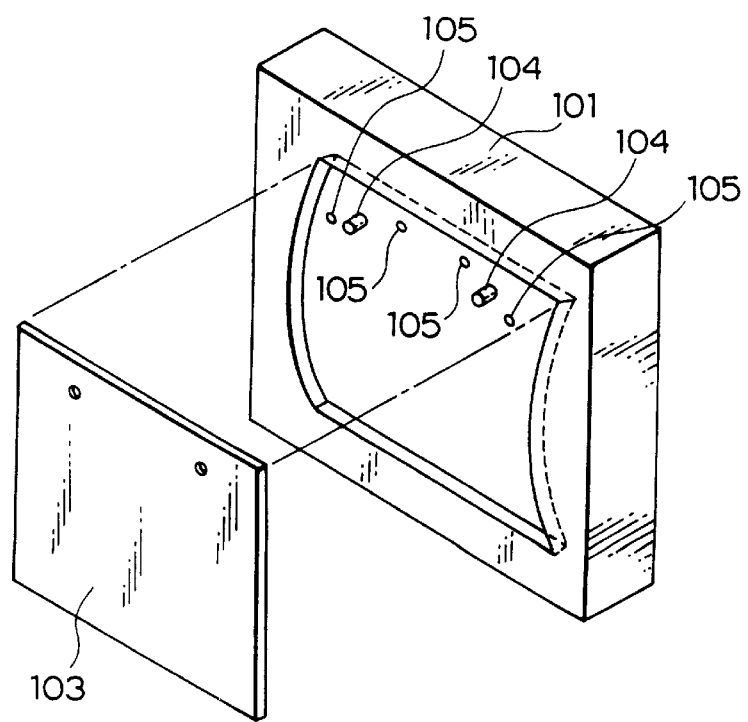
FIG. 8 is a perspective view showing a conventional film holding apparatus.
Figure 9A:
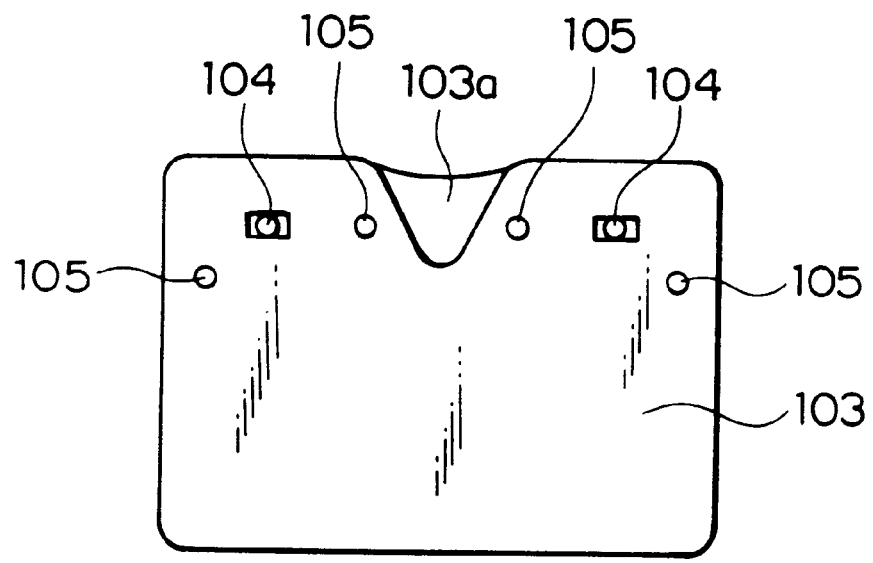
FIGS. 9A and 9B are front views showing a film when a film holding is defective in the conventional holding apparatus, respectively.
Figure 9B:
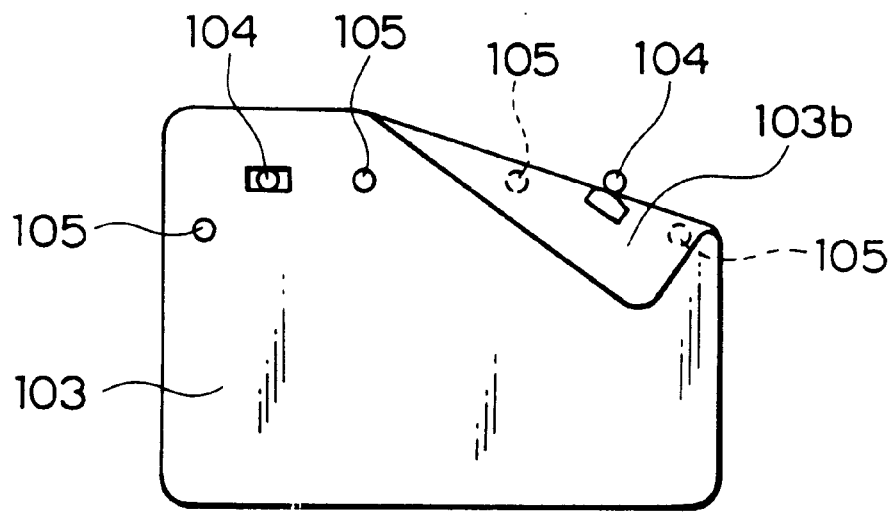

The configuration of the vacuum opening portion can be modified in a mode shown in FIG. 6. In the modified example of FIG. 6, on a mold surface 42a of a mold 42, a second vacuum opening portion 48 situated on the lower side of positioning pins 46 is formed as a linear vacuum opening portion that extends in a straight line over the overall upper edge, and first vacuum opening portions 47 situated on the upper side of the positioning pins 46 are formed as partial linear vacuum opening portions.

In summary, the first and second vacuum opening portions 7 and 8 in the first embodiment interchanged their positions. Similarly, in this case, the same operation and effect as those in the first embodiment can be obtained.

The second vacuum opening portion 8 as described in the above first embodiment, any one of the first and second vacuum opening portions 27 and 28 as described in the above second embodiment, and the first vacuum opening portion 47 as described in the modified example of FIG. 6 may be changed from the linear groove to holes arranged in line, respectively.

Also, in the above embodiments, the inner film is employed as the protective film with which the inner surface of the resin window such as a rear window or a sunroof for an automobile is coated. On the other hand, there is no problem even if the present invention is applied to an outer film with which the outer surface of the resin window is coated. Further, in the above embodiments, the protective film is employed. However, the purpose of the film or sheet to which the present invention is applied is not limited to the surface protection, but the present invention may be applied to a film or sheet on which a pattern or character for decoration is printed. That is, the present invention can be applied to a case in which a film or sheet is held on the mold surface of the injection mold. Also, the molded product is not limited to the resin panel for a resin window of an automobile.

As was described in detail, according to the present invention, because a film or a sheet can be surely held at a specific position of the mold surface of an injection mold, a resin molded product with a film or sheet which is high in quality can be obtained.

What is claimed is:

1. A film or sheet holding apparatus for an injection mold for holding a film or sheet on a mold surface of the injection mold consisting of two coupled molds having substantially-vertical coupled surfaces thereof, said apparatus comprising:

hanging means for hanging an upper edge side of a film or sheet on an upper edge portion of the mold surface of the injection mold; and an adsorbing device having upper and lower vacuum opening means disposed in parallel on the mold surface of the injection mold for adsorbing the film or sheet onto the mold surface of the injection mold;

wherein said hanging means is interposed by said upper and lower vacuum opening means from the upper and lower sides of said hanging means, said respective upper and lower vacuum opening means extend along an upper edge of said film or sheet.

2. The film or sheet holding apparatus for an injection mold according to claim 1, wherein a molten-resin filling inlet is provided above said hanging means and said upper and lower vacuum opening means.

3. The film or sheet holding apparatus for an injection mold according to claim 2, wherein said hanging means comprises a pair of right and left positioning pins;

said upper vacuum opening means comprises one vacuum opening portion which continuously extends over both of said right and left positioning pins; and said lower vacuum opening means comprises a pair of right and left vacuum opening potions that partially extend in the vicinity of said corresponding positioning pins, respectively.

4. The film or sheet holding apparatus for an injection mold according to claim 2, wherein said hanging means comprises a pair of right and left positioning pins;

said upper vacuum opening means comprises a pair of right and left vacuum opening portions which partially extend in the vicinity of said corresponding positioning pins, respectively; and said lower vacuum opening means comprises one vacuum opening portion, which continuously extends over both of said right and left positioning pins.

5. The film or sheet holding apparatus for an injection mold according to claim 2, wherein said hanging means comprises a pair of right and left positioning pins;

said upper vacuum opening means comprises a pair of right and left vacuum opening portions which partially extend in the vicinity of said corresponding positioning pins, respectively; and said lower vacuum opening means comprises a pair of right and left vacuum opening portions which partially extend in the vicinity of said corresponding positioning pins, respectively and one vacuum opening portion which is disposed so as to be overlapped with said pair of vacuum opening portions in the widthwise direction of the mold surface.

* * * * *